Sept. 23, 1969  A. G. AHLSTONE  3,468,559
HYDRAULICALLY ACTUATED CASING HANGER
Filed Oct. 23, 1965  5 Sheets-Sheet 1
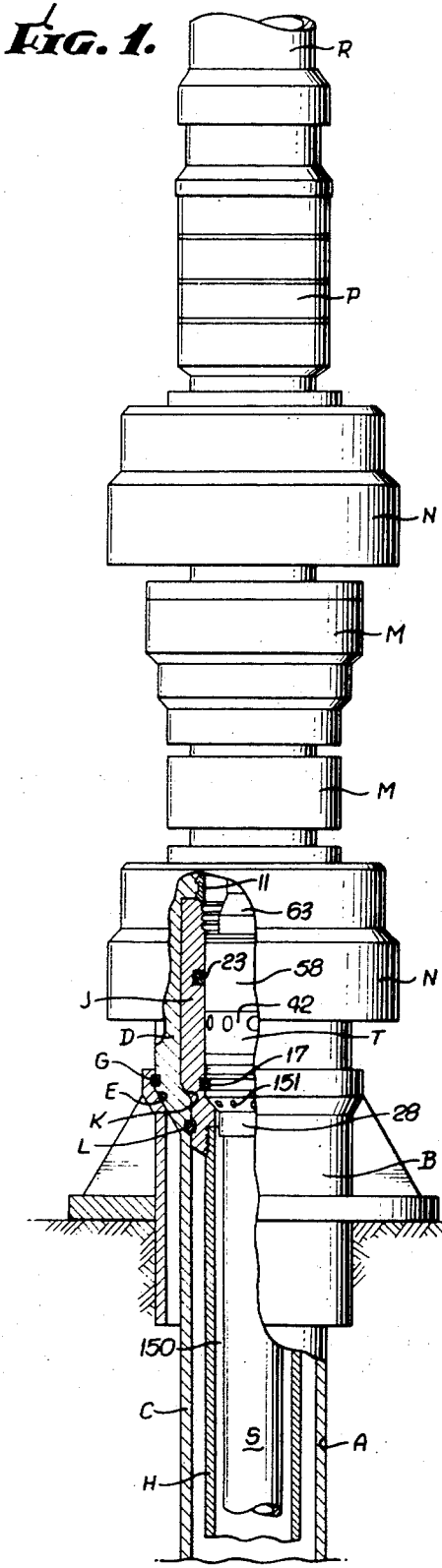
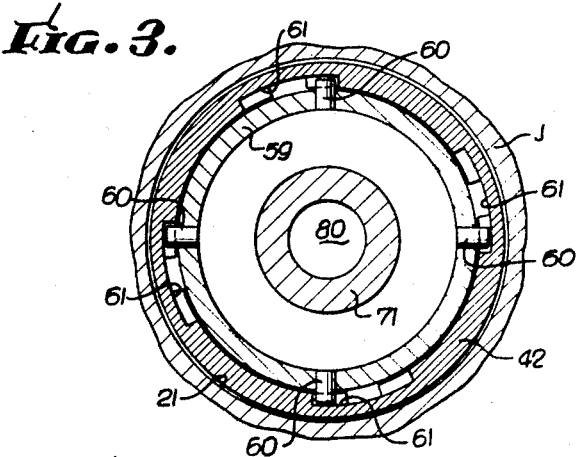
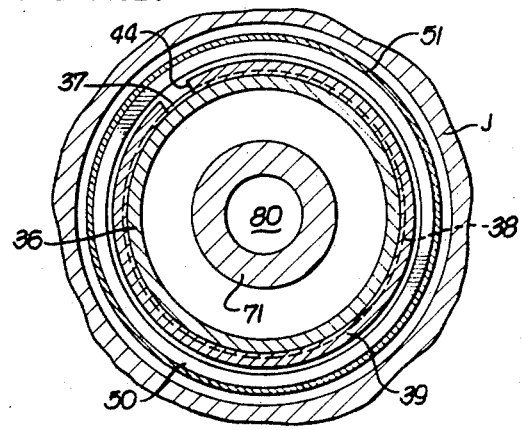
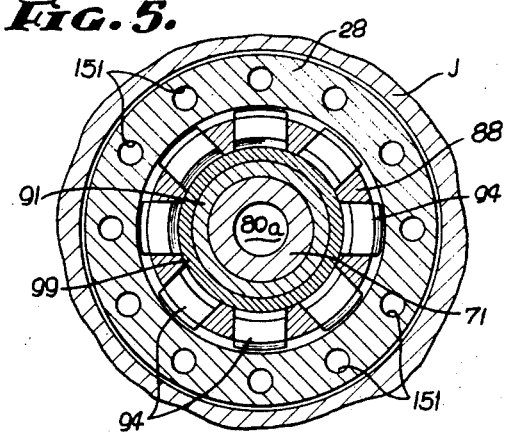
INVENTOR.
ARTHUR G. AHLSTONE
BY Bernard Kriegel
ATTORNEY.

Sept. 23, 1969  A. G. AHLSTONE  3,468,559
HYDRAULICALLY ACTUATED CASING HANGER
Filed Oct. 23, 1965  5 Sheets-Sheet 2
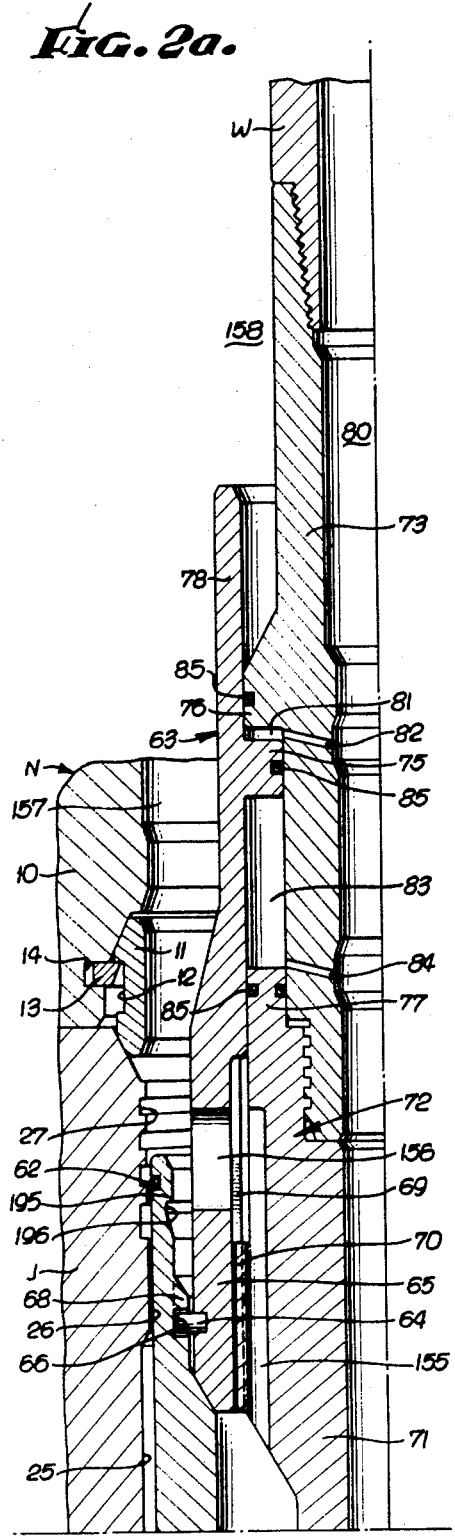
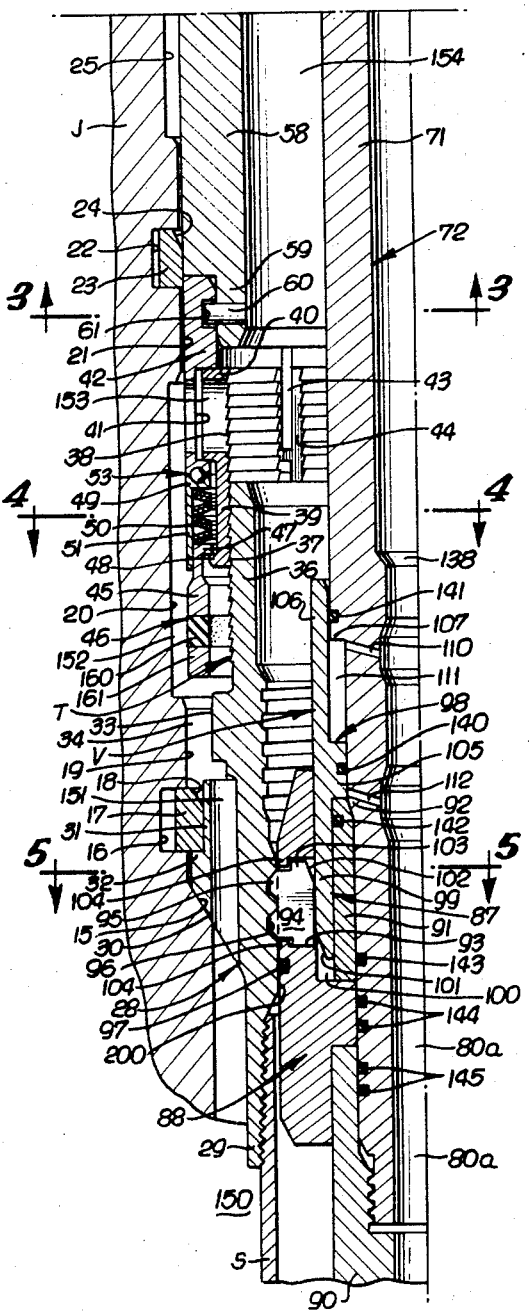
INVENTOR.
ARTHUR G. AHLSTONE
By Bernard Kriegel
ATTORNEY.

Sept. 23, 1969  A. G. AHLSTONE  3,468,559
HYDRAULICALLY ACTUATED CASING HANGER

Filed Oct. 23, 1965  5 Sheets-Sheet 3

INVENTOR.
ARTHUR G. AHLSTONE
BY Bernard Kriegel
ATTORNEY.

Sept. 23, 1969     A. G. AHLSTONE     3,468,559
HYDRAULICALLY ACTUATED CASING HANGER
Filed Oct. 23, 1965                                5 Sheets-Sheet 4
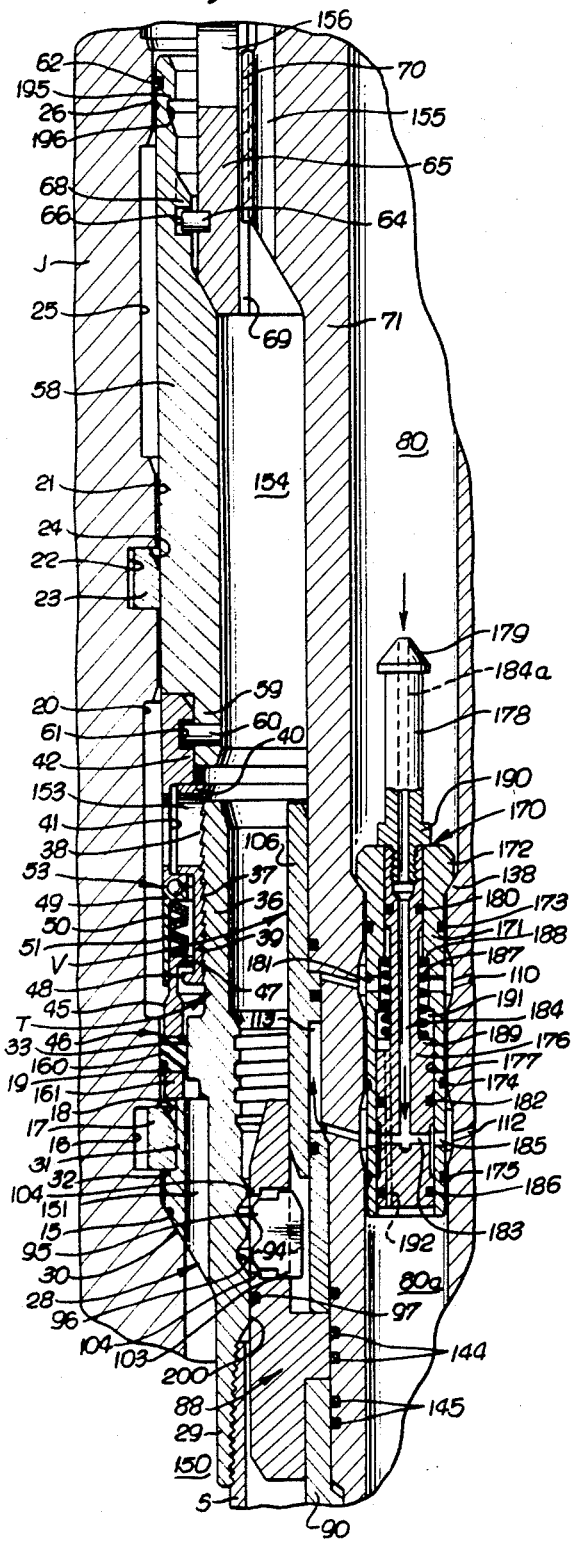
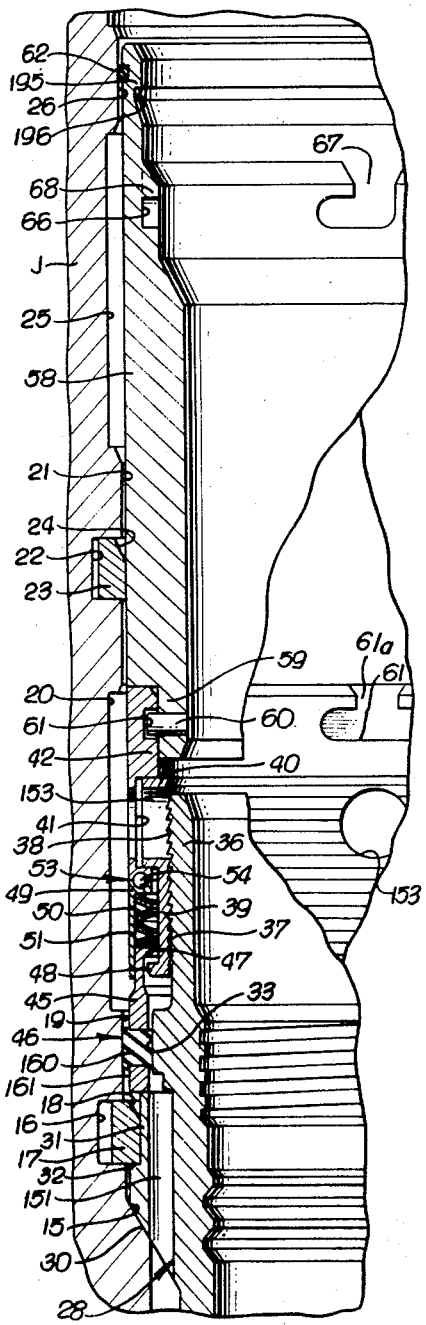
INVENTOR.
ARTHUR G. AHLSTONE
BY Bernard Kriegel
ATTORNEY.

Sept. 23, 1969   A. G. AHLSTONE   3,468,559
HYDRAULICALLY ACTUATED CASING HANGER
Filed Oct. 23, 1965   5 Sheets-Sheet 5

INVENTOR.
ARTHUR G. AHLSTONE
BY Bernard Kriegel
ATTORNEY.

United States Patent Office 3,468,559
Patented Sept. 23, 1969

3,468,559
HYDRAULICALLY ACTUATED CASING HANGER
Arthur G. Ahlstone, Ventura, Calif., assignor to Ventura Tool Company, Ventura, Calif., a corporation of California
Filed Oct. 23, 1965, Ser. No. 503,046
Int. Cl. F16l 55/00, 33/16, 21/00
U.S. Cl. 285—18                               19 Claims

ABSTRACT OF THE DISCLOSURE

Well bore casing hanger apparatus, including an outer hanger body supporting outer casing and an inner hanger body supporting inner casing and movable to a supporting shoulder on the outer body and locked thereto. A packing structure is adapted to be shifted into a sealed position to close an annular passage between the bodies. A tubular string lowers the inner body and packing structure as a unit into the outer body and the packing structure is shifted to its sealed position by hydraulic means, the tubular string and associated operating apparatus for the packing structure, including the hydraulic means, being released from the inner body and packing structure for elevation to the drilling rig.

---

The present invention relates to casing hanger apparatus, and more particularly to apparatus for suspending casing from a well head, performing cementing or other operations in a well bore with respect to suspended casing, and effecting a pack-off between the suspended casing and the well head.

In the drilling of oil and gas wells at an underwater site, different casing strings are hung to protect strata that have drilled through from the pressures and fluids which may be required or encountered at greater depths. In many cases, a special housing or body is provided at or near the ocean bottom to support and seal off a casing string cemented in the well bore. With a drilling rig above water and the special housing or body below water, there are many problems encountered in supporting a casing string, locking the casing hanger in place, verifying that the lock is operative, circulating fluid for conditioning, cementing the casing string, energizing an annular seal, testing the seal, and installing a protector which protects the seat and sealing area in the housing for the next casing hanger used in suspending another casing string to be lowered within the casing string or strings previously installed in the well bore. The problems are accentuated or made more difficult where the drilling rig is on a floating structure anchored in position, but still capable of moving up and down and from side to side.

Heretofore, casing hanger assemblies have been provided which require several trips of a running string into the well bore to assemble all necessary parts to one another, and to perform all necessary operations in the running, landing, cementing, sealing and testing in connection with the casing string, and to protect the seat area for the next succeeding casing hanger to be installed in the well bore. A running string, which may be either casing or drill pipe, and a running tool have been used for lowering the casing hanger body to its seat in a special housing at or near the ocean bottom. Fluid can be circulated down through the casing string suspended from the hanger body and up through the annular area therearound to the annular area above the hanger body to condition the well bore, after which cement is pumped down the running string, through the running tool, and down inside of the casing string, the cement returns moving up the annular area between the casing and the drilled hole or previously installed casing string, the returns passing back to the drilling rig through the annular area between the running string and the pipe which connects the drilling rig to the well bore. The running string and the running tool are then released from the hanger body and returned to the drilling rig.

With the aid of another running tool and running string, the seal or packer assembly is then lowered to the location of the hanger, and by suitable manipulation of the running string, the seal assembly is installed in place. The running tool may have provision to seal off the bore of the well so that pressure applied above the seal assembly of the casing hanger will indicate if the seal will hold pressure. After the pressure test has been performed, the running string and running tool are brought back or retrieved to the drilling rig.

Another running tool is then used with a running string to lower a seat protector to the area just above or on the casing hanger just installed, which is the area or region for the next hanger to be seated or sealed. Following installation of the seat protector, the running string and running tool are released therefrom and returned to the drilling rig.

In the preformance of the above operations, three round trips with a running string are required, and three different running tools, all at a very high cost, in view of the expense of operating offshore drilling rigs.

The main purpose or objective of the present invention is to reduce considerably the expense of performing the above-noted operations, which have, heretofore, been performed separately, in a single trip in the well bore. All of the necessary equipment or apparatus is lowered in the well bore on a running string after the parts have all been assembled to one another at the surface. The hanger body with the casing suspended therefrom, the packer assembly, and the seat protector are all run in the well bore in a single trip. The hanger body is landed on its companion seat, locked in place, fluid circulated for conditioning the well bore, the casing string cemented in place, the seal provided between the hanger and the previously installed hanger, the effectiveness of the seal tested, and the seat protector installed, in one trip in the well bore, after which the running string and the running tool can be disconnected, leaving the assembly in its place, including the location of the seat protector, at its proper location in the previously installed casing hanger.

In effecting the pack-off, the packing element is subjected to compression only, inasmuch as torque or twisting action is not imposed thereon. The hanger body can be locked in place before the circulating and cementing operations commence, so that assurance is had that the hanger cannot be pumped from its companion seat. The sealing effectiveness can be tested before the running tool and running string are elevated from the hole, so that additional pack-off force can be applied, and if the seal is still leaking, the running tool and running string can be removed and a suitable retrieving tool lowered for the purpose of retrieving the packing structure and then lowering a proper packing structure into place so that a proper seal can be effected. The actuation of the packing structure to effect its seal between the hanger body and the previously installed hanger body therearound can occur simultaneously with the release of the running string before the pack-off has been completed.

All of the foregoing operations are performable in a single trip in the well bore, and without the need for rotating the running string. The seal or pack-off is accomplished hydraulically, and the effectiveness of the seal is maintained since a continuing force is acting upon the seal to maintain it in leakproof engagement with its companion surfaces. The running tool and running string are also released hydraulically.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a combined side elevational view and longitudinal section of casing hanger and associated apparatus installed in and in connection with a well bore underlying a body of water;

FIGS. 2a and 2b together constitute a quarter longitudinal section through casing hanger apparatus embodying the invention and landed in a surrounding hanger body or housing, the parts being illustrated in the initial condition which they occupy in lowering the apparatus from the drilling rig, FIG. 2b being a lower continuation of FIG. 2a;

FIG. 3 is a cross-section taken along the line 3—3 on FIG. 2b;

FIG. 4 is a cross-section taken along the line 4—4 on FIG. 2b;

FIG. 5 is a cross-section taken along the line 5—5 on FIG. 2b;

Figure 6A:
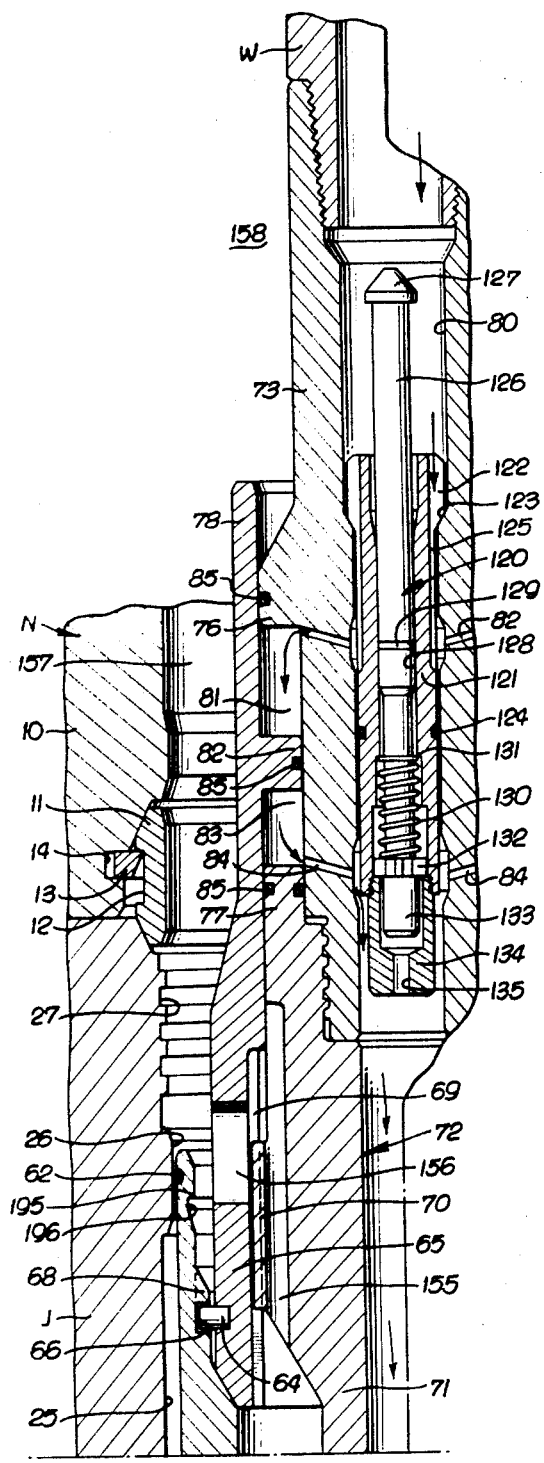
Figure 6B:
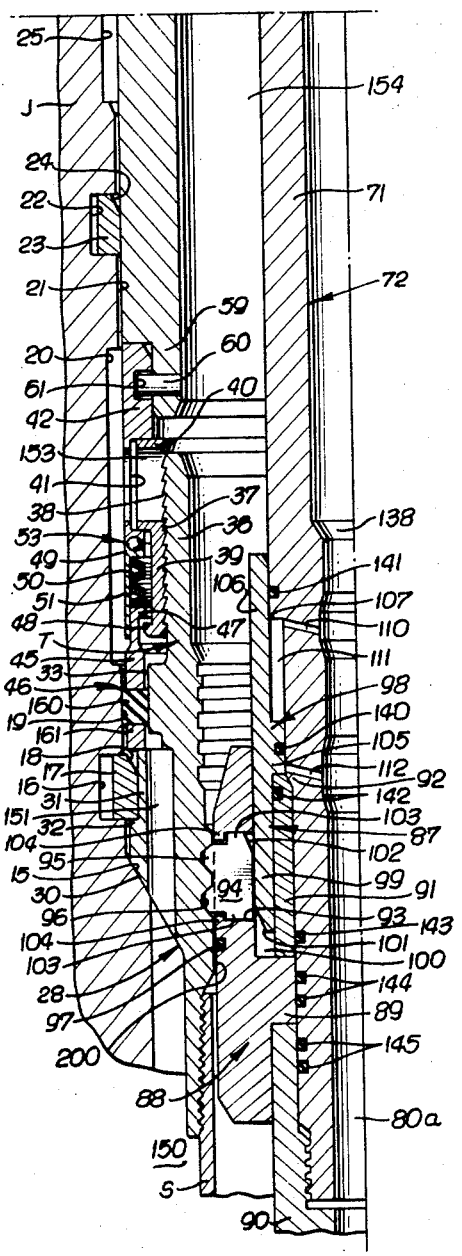
Figure 9:
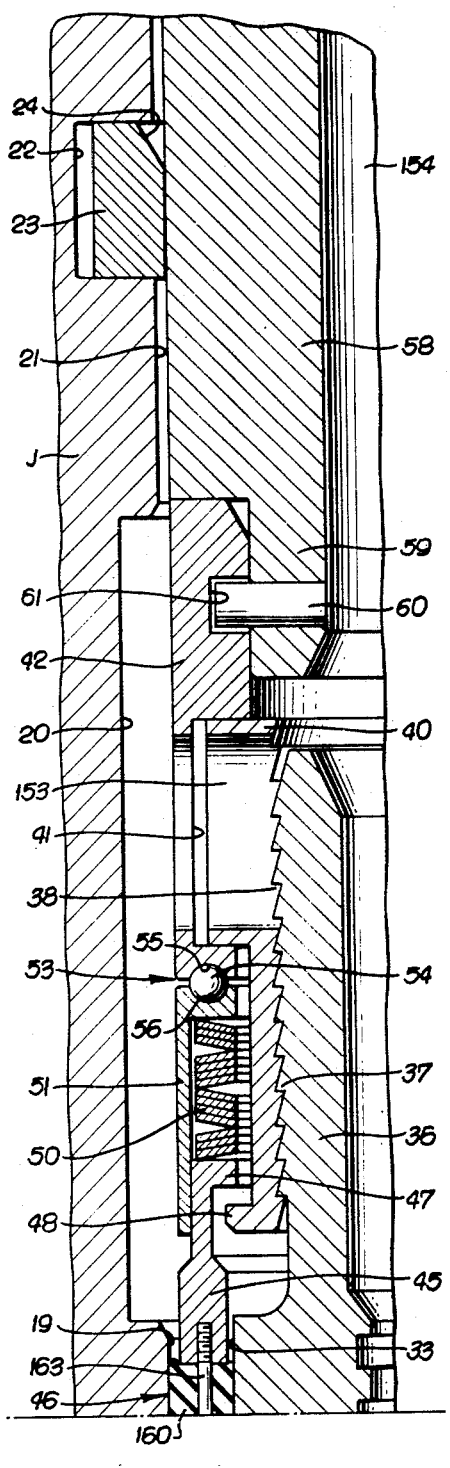
Figure 9A:
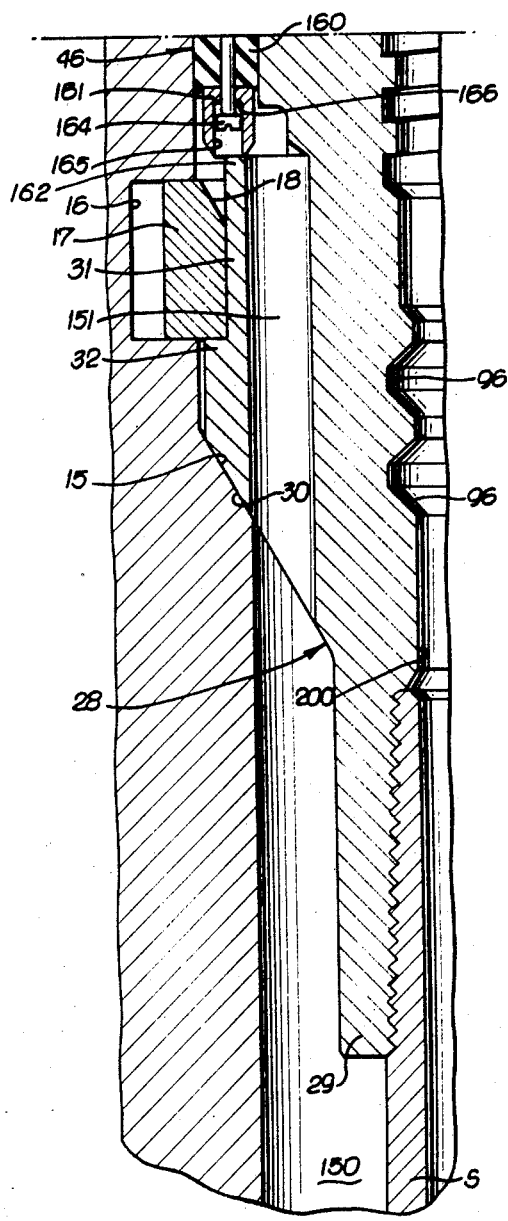

FIGS. 6a and 6b together constitute views corresponding to FIGS. 2a and 2b, with the liner hanger locked in packed-off condition in the well bore, FIG. 6b being a lower continuation of FIG. 6a;

FIG. 7 is a section through the apparatus illustrating the hydraulic coupling of the running tool to the hanger body;

FIG. 8 is a section through the apparatus, parts being broken away, illustrating the casing hanger apparatus and a seat protector thereabove installed in a casing hanger body therearound and with the running tool removed;

FIGS. 9 and 9a together constitute an enlarged fragmentary, longitudinal section through a major portion of the apparatus disclosed in FIG. 8, FIG. 9a being a lower continuation of FIG. 9.

A typical installation of apparatus embodying the invention is illustrated somewhat diagrammatically in FIG. 1, in connection with a well bore A underlying an ocean or other body of water and extending downwardly from the ocean floor F. A suitable base structure B is supported on the ocean floor and carries an outer casing C of relatively large diameter suspended from a casing hanger body D resting upon an outer seat E on the base, being locked thereto by a suitable lock ring G. Disposed within the outer casing is an intermediate string of casing H extending down into the well bore and suspended from a suitable casing hanger body J resting upon a companion tapered seat K in the outer body and suitably locked thereto by means of a lock ring L. One or more blowout preventers M are connected by means of a suitable connector N, such as a hydraulic connector illustrated in my application Ser. No. 476,417, filed Aug. 2, 1965, now Patent No. 3,321,217, for "Coupling Apparatus for Well Heads and the Like," to the hanger body, the blowout preventers being connected by a suitably hydraulic or other connector N to a flexible joint P, made of sections, secured to a marine conductor pipe R extending to the drilling rig, which may be located on a drilling platform or on a floating vessel or structure. An inner string of casing S is disclosed in FIG. 1, as having been locked in packed-off condition in the intermediate hanger body J and it is in connection with the casing hanger apparatus T for this inner casing to which the present invention is directed.

As disclosed in the drawings, the casing hanger assembly T is connected to a running tool V, the upper end of which is connected to a suitable tubular running string W, such as drill pipe, extending through the blowout preventers, connectors, flexible joint and marine conductor pipe to the drilling rig. As shown in FIG. 2a, the hydraulic connector N, which is actually secured to the outer casing hanger body D in the manner illustrated in the above-identified application Ser. No. 476,417, includes an adapter 10 above the hanger bodies, the inner end of the adapter clamping a suitable seal ring 11 between it and the upper end of the intermediate hanger body J, this seal ring having a groove 12 receiving a seal ring retainer 13 mounted in an internal circumferential groove 14 in the coupling adapter. The intermediate hanger body J has a lower downwardly tapering seat or shoulder 15 above which is located an internal circumferential ring groove 16 containing a split inherently contractable lock ring 17 having an upper inner beveled surface 18. Above the lock ring groove 17 is an internal seal surface 19 of cylindrical form, and above this seal surface is an enlarged internal bore 20 which terminates at another internal cylindrical surface 21, which may be of the same diameter as the seal surface 19. Another internal circumferential groove 22 opens through this last-mentioned cylindrical surface and contains a split inherently contractable lock ring 23 having an upper inner beveled surface 24. Above the cylindrical surface 21, the outer hanger body J has another enlarged bore 25, and above this enlarged bore, the body has another internal cylindrical surface 26 above which is provided a suitable internal thread 27 in the hanger body.

The casing hanger apparatus T includes a body 28 having a lower threaded portion 29 connected to the casing S suspended therebelow. This body has a downwardly facing tapered seat 30 adapted to engage the upwardly facing seat 15 in the surrounding hanger body J. Above this seat is a reduced external diameter portion 31 providing an upwardly facing shoulder 32 engageable with the lower end of the lock ring 17 when the hanger is moved past the lock ring, during which time the latter is expanded outwardly within its internal groove 16, then contracting partially inwardly across the shoulder 32 so as to lock the hanger body 28 in place by preventing its upward movement.

Above the lock shoulder is a reduced diameter, external, cylindrical seal surface 33 which will be disposed opposite the internal seal surface 19 of the surrounding hanger body and in spaced relation therewith to provide an annular passage 34 therebetween, when the hanger body comes to rest upon its companion seat 15. Above this seal surface, the hanger body has a reduced external diameter portion 36 that has downwardly facing ratchet teeth 37 thereon, which are formed as a right-hand buttress thread, and which mesh with companion upwardly facing ratchet teeth 38, or a right-hand buttress thread, provided on the interior of a split inherently contractable packer actuating sleeve 39. This sleeve has an outwardly projecting upper portion 40 received within an internal circumferential groove 41 is a thrust sleeve 42, rotation of this thrust sleeve being transmitted to the actuating sleeve in any suitable manner, as by securing a key 43 to the thrust sleeve which is located in the slot or split 44 of the actuating sleeve. The actuating sleeve 39 supports an upper abutment 45 of a seal or packer structure or assembly 46 because of an inwardly directed flange 47 on the upper portion of the upper abutment overlying an outwardly extending lower flange 48 of the actuating sleeve. A spring seat 49 surrounds the actuating sleeve 39 and is disposed above the upper end of the upper abutment 45, there being a spring device 50 between the spring seat and the upper abutment constituted by a plurality of conical springs or Belleville washers that bear against the upper abutment 45 and also against the spring seat 49. This spring seat has a skirt 51 enclosing the Belleville or conical springs 50 and the upper portion of the upper abutment 45.

To prevent any rotation of the thrust sleeve 42 and the actuating sleeve 39 from being transmitted to the upper abutment 45, spring seat 49 and conical springs 50, a thrust bearing 53 is provided between the thrust sleeve and the spring seat. As shown, a plurality of ball bearing elements 54 are disposed in an upper race 55 in the lower end of the thrust sleeve and in a lower race 56 in the upper end of the spring seat, providing a swivel that will allow downward thrust of the thrust sleeve 42 to be transmitted to the spring seat 49, washers 50 and the upper abutment 45, but which will prevent rotational effort of the thrust sleeve 42 from being transmitted thereto.

Downward movement of the thrust sleeve 42 and of the actuating sleeve 39 will result in the exertion of an axial force against the pack-off assembly 46, so as to shorten the latter and compress it between the opposed sealing surfaces 19, 33, as described hereinbelow.

The thrust sleeve 42 is connected to a seat protector 58 thereabove, which has a reduced diameter portion 59 piloted within the sleeve. The seat protector has a plurality of circumferentially spaced radial torque pins 60 extending into inverted T-shaped slots 61 in the sleeve 42. The seat protector carries an external seal ring 62 at its upper portion, which is adapted to seal against the internal cylindrical surface 26 of the surrounding hanger body J, as described hereinbelow, and this seat protector is connected to an actuating cylinder 63, forming part of the running and actuating tool V, by a plurality of circumferentially spaced coupling pins 64 on the lower portion of the cylinder sleeve 65 disposed within companion J-slots 66 in the seat protector. The vertical legs 67 of the J-slots open upwardly through an upwardly facing shoulder 68 of the seat protector, the cylinder sleeve 65 having internal splines 69 adapted to slidably mesh with external splines 70 on the lower section 71 of the running tool mandrel 72, which is threadedly connected to an upper mandrel section 73, the upper end of which is threadedly secured to the tubular running string W, such as drill pipe, extending to the drilling rig above the body of water.

The annular cylinder 63 includes an inwardly directed cylinder head 75 slidable along the upper mandrel section 73 between an upper piston portion 76 of the upper mandrel section and a lower piston portion 77 provided by the upper part of the lower mandrel section 71. The head 75 is integral with an upper cylinder sleeve 78 slidable along the upper piston portion 76 and with the lower cylinder sleeve 65, which is slidable along the lower piston portion 77. Fluid can pass between the mandrel passage 80 and the upper cylinder space 81 between the head and upper piston portion through upper mandrel ports 82. Fluid can also pass between the mandrel passage 80 and the lower cylinder space 83 between the head 75 and the lower piston portion 77 through the lower mandrel ports 84. Suitable seal rings 85 on the piston portions 76, 77 and cylinder head 75 prevent fluid leakage between the cylinder 63 and mandrel 72.

The mandrel 72 is releasably connected with the hanger body by a hydraulically operated device 87. As disclosed most particularly in FIGS. 2b, 6b and 7, the hydraulically operable connection includes a body 88 surrounding the lower portion 71 of the mandrel and having an inwardly directed flange 89 clamped between the upper end of a drill pipe joint 90, threadedly secured to the lower end of the mandrel, and a lower piston sleeve 91 above the flange, the upper end of which is engageable with a downwardly facing mandrel shoulder 92. The body has a plurality of circumferentially spaced openings or slots 93 in which are disposed latches, locking segments or dogs 94 that have outer tapered fingers or lugs 95 adapted to fit within companion circumferential internal grooves 96 in the casing hanger body. With the latches in the grooves, a seal ring 97 on the body 88 seals against the hanger body 28. An annular expander and retainer cylinder 98 surrounds the running tool mandrel 72 and has a lower cylinder sleeve portion 99 adapted to move within the annular space 100 between the body 88 and the lower piston sleeve 91 to a position behind the locking segments 94, in order to hold them outwardly with their fingers 95 within the hanger body grooves 96. The lower sleeve 99 has a tapered nose 101 adapted to engage companion tapered surfaces 102 in the upper portion of the dogs or segments 94 for the purpose of shifting such segments outwardly into the grooves 96, the extent of outward movement of the segments being limited by engagement of their upper and lower terminals 103 with the upper and lower stop portions 104 provided on the body on opposite sides of its slots 93.

The lower sleeve 99 merges into a cylinder head 105, which is slidable along the periphery of the mandrel 72, and this cylinder head, in turn, merges into an upper cylinder sleeve 106 slidable along an enlarged diameter portion 107 of the mandrel, which conforms in external diameter to that of the lower piston sleeve 91. The cylinder 98 is shiftable hydraulically along the mandrel 72 and within the body 88 surrounding it, between a lower position illustrated in FIGS. 2b and 6b, in which the lower cylinder sleeve 99 is disposed behind the segments 94, to maintain them locked within the internal grooves 96 of the casing hanger body 28, and an upper position in which the lower cylinder sleeve 99 is disposed above the lock segments 94, permitting them to retract inwardly and fully from the internal body grooves 96, so as to effect a disconnection between the mandrel 72 and the hanger body 28.

The longitudinal shifting of the cylinder 98 along the mandrel 72 and with respect to the body 88 is accomplished hydraulically. Thus, fluid can flow through upper ports 110 extending from the central mandrel passage 80 into an annular cylinder space 111 between the cylinder head 105 and an upper piston head 107 provided by the mandrel for the purpose of shifting the cylinder 98 in a downward direction along the mandrel. The annular cylinder member is shifted in an upward direction by fluid passing from the central passage 80 in the mandrel through a plurality of lower ports 112 into a cylinder space 113 provided between the lower piston sleeve 91 and the cylinder head 105 for action upon the lower surface of the latter, urging the cylinder 98 upwardly to a position in which the cylinder head engages the upper piston head 107, as disclosed in FIG. 7, in which the dogs 94 can be freed from the grooves 96.

The running tool V is connected to the hanger body 28 and the parts of the apparatus disposed therearound by having the pack-off assembly 46 in its initial retracted position and with the packing actuating sleeve 39 in its upper threaded or ratchet position on the casing hanger body 28. The seat protector is connected to the upper portion of the thrust sleeve 42 by virtue of the torque pins 60 being disposed in the T-slots 61 and the seat protector 58 is connected to the hydraulic actuating cylinder 63 by reception of the torque pins 64 of the latter within the J-slots 66. At the drilling rig, the running tool V is lowered into the hanger body 28 until the locking dogs 94 are opposite the circumferential grooves 96 at which time the dogs are retracted and the cylinder and its sleeve 99 are disposed in their upper position along the mandrel. A dart or plug 120 is then lowered into the mandrel 72 for the purpose of directing fluid under pressure from the mandrel passage 80 through the upper ports 110 into the upper cylinder space 111. This dart is of the same type as the dart illustrated in FIG. 6a, but of a slightly smaller diameter. The dart disclosed in FIG. 6a includes an outer body 121 having an upper head 122 adapted to seat upon an upwardly facing shoulder 123 in the mandrel above the ports 82. This body carries a suitable side seal ring 124 adapted to seal against the wall of the mandrel passage between the upper and lower sets of ports 82, 84, the body 121 having a plurality of longitudinal external grooves 125 therein through which fluid under pressure can pass to the upper mandrel ports 82. The dart or plug also includes a central valve stem 126 disposed within the body and having a fishing head 127 projecting above the upper end of the latter. This stem is sealed against the wall of the body passage 128 by a seal ring 129 and is urged in a downward direction by the helical compression spring 130 surrounding the lower portion of the stem, with its upper end bearing against a downwardly facing body shoulder 131 and its lower end bearing against a spider 132 forming the upper end of a cap 133 threaded on the lower end of the stem 126. The spider 132 constitutes a flange resting upon the upper end of a stem retainer 134 threaded into the lower end of the body and which has a central passage 135 therethrough. This stem retainer 134 and the body portion 121 surrounding it are smaller in diameter than the diameter through the mandrel passage below the shoulder 123, providing an annular space to permit any fluid from the lower cylinder space 83 to pass through the lower ports 84 and into the mandrel passage 80 below the dart 120.

The dart or plug (not shown) used in connection with the hydraulic latching device 87, as was stated above, is the same as the dart or plug 120 described above and which is used in hydraulically effecting a pack-off between the opposed sealing surfaces 19, 33, as described hereinbelow. The dart used for latching the mandrel 72 to the hanger body 28 is of a smaller diameter than the dart described above and its head will move downwardly through the mandrel passage and will come to rest on a seat 138 at the upper end of a smaller diameter mandrel passage, the dart body being appropriately sealed between the upper and lower sets of ports 110, 112.

With the head of the dart body engaging the seat 138 in the mandrel passage 80, it is evident that fluid under pressure will pass through the external grooves 125 in the upper portion of the body and through the upper body ports 110 to shift the cylinder sleeve 99 downwardly behind the dogs 94 and move them outwardly to place their fingers or lugs 95 fully into engagement with the circumferential lock grooves 96 in the casing hanger body 28, the sleeve 99 remaining behind the dogs and holding them locked within the body grooves. By means of a suitable fishing tool (not shown), the head 127 of the smaller dart can be grasped and moved upwardly to retrieve the smaller size dart or plug from the mandrel passage 80.

It will be evident from the drawings that leakage of fluid under pressure between the various parts to which it is applied is prevented by a suitable seal ring 140 on the cylinder head 105 engaging the periphery of the mandrel, by an upper seal ring 141 on the mandrel slidably engaging the inner surface of the upper sleeve 106, by an external seal ring 142 on the lower piston sleeve engaging the inner surface of the lower cylinder sleeve 99 and by a seal ring 143 on the mandrel below the lower ports 112 engaging the inner surface of the lower piston sleeve 91. The inwardly directed body flange 89 is sealed to the mandrel by seal rings 144 on the latter engaging the flange, leakage of fluid between the lower end of the mandrel and the drill pipe joint 90 therebelow being prevented by seal rings 145 on the mandrel engaging the inner surface of the drill pipe.

When the hanger apparatus T and the casing S suspended therefrom are connected to the running tool V and lowered through the marine conductor pipe R and the equipment connected thereto by means of the drill pipe W to the position illustrated in FIGS. 2a and 2b, in which the hanger body 28 rests upon its seat 15 and the lock ring 17 has contracted over the upwardly facing shoulder 32, a by-pass circulating passage exists between the hanger apparatus and the surrounding hanger body J. As shown, this by-pass communicates with the annulus 150 in the well bore surrounding the suspended casing S and includes a plurality of circumferentially spaced longitudinal fluid passages 151 extending through the hanger body 28 to the annular passage 34 between the opposed seal surfaces 19, 33. Fluid can then pass upwardly through the annular space 152 between the pack-off assembly 46 and the enlarged bore 20 of the external casing hanger J, and thence inwardly through a plurality of fluid by-pass holes 153 formed through the thrust sleeve 42 and actuating sleeve 39 to the interior of the latter, then passing upwardly through an annular passage 154 between the seat protector 58 and the mandrel 72, the by-pass path then continuing through a plurality of holes 155 in the upper portion of the lower mandrel section 71 and through a plurality of side ports or holes 156 in the lower portion of the lower cylinder sleeve 65 to the annulus 157 around the cylinder 63, the fluid flow then being capable of continuing upwardly through the annulus 158 around the tubular running string W to the drilling rig.

The packing assembly 46 includes the upper abutment ring 45 which engages an initially retracted packing element ring 160 made of an elastomer material, such as rubber or a rubber-like material, the lower end of this packing ring being engaged by a lower abutment 161 adapted to engage an upwardly facing shoulder 162 on the hanger body 28 below its external seal surface 33. The packing ring 160 and the lower abutment ring 161 are assembled to the upper abutment ring 45 by a plurality of cap screws 163 extending through the lower ring and packer ring and threaded into the upper abutment ring, the screws having heads 164 received within counterbores 165 in the lower abutment ring and adapted to engage the upper ends 166 of the counterbores.

Prior to lowering the casing apparatus and the casing S suspended therefrom into the well bore, the casing hanger apparatus T has its parts in their relative positions illustrated in FIGS. 2a and 2b in which the packing element or ring 160 is retracted and with the actuating sleeve 39 occupying its upper position on the hanger body 28, the thrust sleeve 42 being connected to the seat protector 58 by the pin and T-slot connections 60, 61 and the seat protector being connected to the cylinder 63 through the pin and J-slot connections 64, 66. The lower portion of the mandrel 72 is secured to the hanger body 28 by means of the hydraulically actuated connection 87, as above described.

The casing S is lowered from the drilling rig through the equipment disposed above the ocean floor and into the well bore A, the uppermost portion of the casing string being secured to the hanger apparatus T, which has its parts in their relative relationship illustrated in FIGS. 2a and 2b. The tapered shoulder 30 of the hanger body will move past the upper lock ring 23 and shift it outwardly out of its way and will then move downwardly into engagement with the lower lock ring 17, expanding it into its groove 16 out of its way until the hanger body engages its companion seat 15 in the surrounding hanger body J, whereupon the lock ring 17 will contract across the body shoulder 32 and lock the hanger body and the casing S suspended therebelow in place. At this time, the seat protector 58 or thrust sleeve 42 is disposed across the upper lock ring 23 and the seal ring 62 on the seat protector is out of sealing relation to its companion seal surface 26 at the upper portion of the outer hanger body J. An upward pull can now be taken on the running string W to insure that the hanger body 28 is locked in place. Circulating fluid can now be pumped down through the tubular running string W and through the mandrel 72, continuing on down through the casing S and then passing around its lower end or suitable casing ports (not shown) into the annulus 150 between the suspended casing string and the well bore and also between the casing string S and whatever casing string H is surrounding it. The circulating fluid flows upwardly through the body passages 151 and through the annular passage 34 between the internal and external seal surfaces 19, 33, flowing upwardly around the packing assembly 46 and through the by-pass holes 153 in the sleeves for upward movement through the annular passage 154 between the seat protector and mandrel 72, passing through the mandrel holes 155 and cylinder opening 156 into the annulus 157 around the cylinder, continuing upwardly through the annulus 158 around the running string W to the drilling rig.

The circulating fluid can be followed by the pumping of a suitable charge of cement down through the running string, the mandrel and the suspended casing string. This charge of cement slurry will move upwardly through the annulus 150 around the casing string to the desired height, in a known manner, the fluid in advance of the charge of cement slurry passing upwardly through the by-pass path through and around the casing hanger apparatus T.

After the cement has been displaced around the casing S, the larger diameter dart or plug 120 is lowered through the string of drill pipe W, moving into the mandrel passage 80 in the region of the actuating cylinder 63, and with its head 122 coming to rest upon the companion upper mandrel shoulder 123, the seal ring 124 on the dart body effecting a seal below the upper set of ports 82. Pressure can now be imposed on the liquid in the tubular string W and the mandrel passage 80 above the dart, such fluid under pressure passing through the grooves 125 and through the upper set of ports 82 into the upper annular cylinder space 81, shifting the cylinder 63 downwardly along the mandrel 72. This downward movement is transferred from the lower end of the cylinder sleeve 65 to a seat protector shoulder 58a that it engages, the downward motion of the latter then being transferred through the thrust sleeve 42, which moves downwardly and shifts the ratchet or actuating sleeve 39 downwardly with it, as well as the spring accumulator device 47–51 and the pack-off assembly 46, the sleeve 39 ratcheting freely over the companion ratchet teeth 37 on the inner hanger body 28. The downward movement of the parts continues until the lower abutment 161 engages the body shoulder 162, at which time the packing sleeve 160 is disposed between the inner and outer seal surfaces 19, 33. A continuation of the hydraulic force in the upper cylinder 81 is then transmitted through the seat protector 58, thrust sleeve 42, thrust bearing 53, and Belleville springs 50 to the upper abutment 45, shifting the latter toward the lower abutment 161 and shortening the packing sleeve 160 and expanding it outwardly and inwardly into firm sealing engagement with the inner and outer sealing surfaces 19, 33. At this time, the springs 50 are compressed and have energy stored in them; whereas, the ratchet sleeve 39 continues moving downwardly over the companion ratchet teeth or buttress thread 37 of the hanger body to preclude return movement of the upper abutment 45 relative to the lower abutment. Some slight return movement might be possible in view of the play between the internal and external ratchet teeth 38, 37. However, the springs 50 will have been compressed sufficiently and have substantial energy stored therein for the purpose of resisting and preventing upward movement of the upper abutment 45 away from the lower abutment 161. In fact, the springs 50 act as an accumulator to exert a continuing force on the upper abutment to insure the compressed state of the packing sleeve 160 and its effective sealing against the inner and outer seals 19, 33 on the outer and inner hanger bodies J, 28, respectively. During downward movement of the cylinder 63 along the mandrel, fluid in the lower cylinder space 83 can pass therefrom through the lower ports 84 and around the dart body 121 into the mandrel passage 72, as shown in FIG. 6a.

Although an efficient pack-off can be accomplished without the necessity for rotating the running string W and mandrel 72, through the application of hydraulic pressure to the annular cylinder 63, torque can still be transmitted to the actuating sleeve 39 to insure its downward threading along the external buttress threads 37 for the purpose of further compressing the Belleville or conical springs 50 and exerting an additional pack-off force on the packing sleeve 160. Rotation of the running string and mandrel will effect rotation of the cylinder 63, because of its splined connection 69, 70 with the mandrel, the rotary effort then being transmitted through the J-pin and slot connection 64, 66 to the seat protector 58 and through the pin and T-slot connection 60, 61 to the thrust sleeve 42, the key 43 on the thrust sleeve transmitting the rotary motion to the actuating sleeve 39 and threading the latter on and downwardly of the hanger body 28 to effect the additional compression of the springs 50 and of the packing sleeve 160. It is to be noted that during the entire rotation of the thrust sleeve 42 and actuating sleeve 39, the torque is not transmitted to the packing structure 46, so that no twist is imparted to the latter, but only an axial compressive force in effecting its pack-off against the inner seal surface 19 and the external seal surface 33.

The effectiveness of the packed-off seal can now be tested with all of the apparatus remaining in place. A suitable pressure is imposed on the fluid in the annulus 158 surrounding the tubular running string W, as, for example, by closing a blowout preventer M thereagainst and then subjecting the fluid in the annulus below the blowout preventer to adequate pressure. If no pressure loss occurs, assurance is had that the seal is effective. The fact that the latch body 88 is still sealed against the anchor body 28 will prevent fluid from passing between the mandrel 72 and the hanger body 28. If a leak is detected, which is determined to be due to the packing 160, an additional compression of the packing sleeve can be undertaken, imparting additional pressure to the cylinder 63, or by turning the running string and the mandrel, or both, which will effect an additional downward shifting of the thrust and actuating sleeves 42, 39 along the hanger body 28.

Assuming the seal 160 does not leak, the upper dart 120 is fished from the mandrel, and the running string and mandrel disconnected from the hanger body, such disconnection being effected hydraulically. As disclosed in FIG. 7, another dart or plug 170 is lowered down through the running string W and into the smaller diameter mandrel passage 80a, this plug including a body 171 having an upper head 172 which will come to rest upon the upwardly facing seat 138 in the mandrel. When the head engages the seat, an upper side seal ring 173 on the body sealingly engages the wall of the mandrel passage above the upper ports 110, an intermediate seal ring 174 on the body engages the wall of the mandrel passage between the upper and lower ports 110, 112, and a lower seal ring 175 on the body engages the wall of the mandrel passage below the lower ports 113. A stem 176 is disposed within the central passage 177 through the plug body 171, this stem including an upper portion 178 having an upper fishing head 179 which is threadedly secured to the main portion of the stem. An upper seal ring 180 on the main stem portion engages the wall of the body bore 177 above a plurality of upper ports 181 extending from the central passage 177 of the body to its exterior, communicating with the upper mandrel ports 110. An intermediate seal ring 182 is disposed on the stem 176 and sealingly engages the wall of the body bore above a set of lower ports 183 in the stem, extending from a central passage 184 running upwardly through the stem and communicating with a central passage 184a in the upper stem portion 178 which is open at its upper end, the stem ports 183 communicating with side ports 185 extending through the body in communication with the mandrel ports 112. A lower seal ring 186 is mounted on the lower portion of the stem and sealingly engages the wall of the body passage 177 below the stem ports 183. A helical spring 187 surrounds a reduced diameter portion of the stem 176, its upper end bearing against a body shoulder 188 and its lower end against a stem shoulder 189, urging the stem in the downward position illustrated in FIG. 7, limited by a stem flange 190 engaging the body 171.

When the dart 170 is disposed in the position shown in FIG. 7, fluid pumped down the running string W and into the mandrel 72 can flow through the stem passages 184a, 184 and out through the ports 183, 185 of the dart and through the mandrel ports 112 into the lower annular space 113 between the lower piston 91 and the mandrel, the fluid under pressure acting in an upward direction on the cylinder head 105 and shifting the annular cylinder 98 upwardly along the mandrel 72 to a position in which the locking dogs or latches 94 are free to shift inwardly from the hanger body groves 96. The fluid or liquid in the cylinder space 111 above its head 105 can pass outwardly through the upper mandrel ports 110 and through the body ports 181 into the annular spring space 191, then continuing downwardly through a discharge passage 192 extending through the stem, the exhausting fluid then flowing out of the lower end of the lower stem and into the mandrel below the dart 170.

The running tool V can now be disconnected from the seat protector 58 merely by partially turning the running string W to the right to be assured that the cylinder pins 64 are disposed against the ends of the J-slots 66 and in alignment with their vertical legs 67, whereupon the tubular running string W is moved upwardly to move the pins 64 out of the J-slots, which permits the running tool V to be removed from the casing hanger apparatus T and elevated through the equipment thereabove to the drilling rig, the hanger parts then being in the position illustrated in FIG. 8, with the seat protector 58 in place and with an effective pack-off existing between the hanger body 28 and the hanger body J or other device therearound. At this time, it is to be noted that the downward movement of the seat protector 58 will have shifted its seal ring 62 into sealing engagement with the cylindrical surface 26 at the upper portion of the surrounding hanger body J.

When the seat protector is no longer required, it is easily removed by lowering a suitable retrieving tool on a running string. This retrieving apparatus may be of the type disclosed in my application for "Well Bore Running-In and Retrieving Tool," Ser. No. 503,563, filed Oct. 23, 1965, now Patent No. 3,350,130. This tool becomes coupled to the seat protector 58, by latching under a downwardly facing shoulder 195 of an internal groove 196 in the upper portion of the seat protector, with suitable pins entering the J-slots 66 so as to be coupled to and transmit torque to the seat protector. The retrieving tool (not shown) can then be appropriately turned by turning the running string W to turn the seat protector 58 relative to the thrust sleeve 42 and align the torque pins 60 with the vertical legs 61a of the inverted T-slots 61, which will then allow an upward pull to be taken on the apparatus to shift the pins 60 from the T-slots and thereby effect a full disconnection of the seat protector 58 from the thrust sleeve 42, the seat protector then being withdrawn with the running string and retrieving tool to the drilling rig above the body of water.

In the event that a leakproof seal is not effected between the packing ring 160 and the inner and outer hanger bodies 28, J, the packer assembly 46 can be removed. The retrieving tool shown in the above application, Ser. No. 503,563, is connected to a tubular string W and lowered from the drilling rig into a position in which pins of the retrieving tool, corresponding to the torque pins 60 of the seat protector 58, move into the T-slots 61, whereupon the running string and retrieving tool are rotated to the left to thread the entire packer assembly upwardly of the buttress threads 37 of the body 28 and completely disconnect the actuating sleeve 39 from the body, whereupon the packer assembly can be elevated to the drilling rig and a new pack-off assembly substituted in its place, which is then run, with a seat protector 58 and running tool connected thereto, through the equipment above the floor of the ocean and connected to the hanger body 28, by means of the ratchet threads 37, 28, hydraulic pressure again being employed to shift the packing actuating sleeve 39 downwardly and effecting a pack-off of the packing sleeve 160, against the internal and external sealing surfaces 19, 33, the packer assembly then being in the condition illustrated in FIGS. 6b and 8. The running tool preferably seals against the internal cylindrical surface 200 of the hanger body in essentially the same manner as disclosed in FIG. 6b, allowing the liquid in the annulus 158 around the running string W to be subjected to pressure to test the effectiveness of the new seal.

Following removal of the seat protector 58, the upper lock ring 23 is then in position to lock another hanger body (not shown) from which another casing string (not shown) is suspended, the hanger body resting upon the upper end of the hanger body 28 previously installed and having a shoulder that will be disposed below the lock ring 23 that will contract partially out of its internal groove 22 to overlie the shoulder of the hanger body, in essentially the same manner as the lower lock ring 17 overlies the shoulder 32 of the previously installed hanger body 28. A pack-off can be effected between a packing ring against the seal surface 21 above the upper lock ring 23 in essentially the same manner as with the packing assembly 46 described above, the groove 25 in the surrounding hanger body affording by-pass area for circulating fluid that passes upwardly around the annulus between the subsequently run casing string (not shown) and the casing string S described above.

It is, accordingly, apparent that well bore casing hanger apparatus has been provided which requires only a single trip into the well bore to run, land, lock the hanger in place, test the lock, circulate fluid, pump cement for sealing and supporting the suspended casing in the drilled hole, actuate the area of the seal, test the seal, and install the seat protector. All necessary apparatus is appropriately assembled at the drilling rig and is run simultaneously into the well bore. Rotation of the running string is not essential to full actuation of the apparatus and release of the running tool therefrom. The packing element is packed off by being subject to longitudinal compression only, there being no torque or twisting action imposed upon it, and a continuing pack-off force is applied to it because of the energy stored in the Belleville springs. The hanger is locked in place before the cementing operation begins so that it cannot be pumped off its supporting seat. The effectiveness of the pack-off of the packing can be tested before the running string is removed from the hole, and, if necessary, a defective pack-off can be remedied by retrieving the packing structure is view of the ability to couple into the packing actuating sleeve 39 and reversely rotate it to unthread it completely from the hanger body 28.

I claim:

1. In well bore casing apparatus: an outer body connectible to an outer casing; an inner body supportable by said outer body for suspending an inner casing within the outer casing; said inner and outer bodies providing a fluid passage therebetween communicating with the annular space between the inner and outer casings; a packing structure for closing said passage; a mandrel adapted for connection to a running string; means releasably connecting said mandrel to said inner body; means releasably connecting said packing structure to said mandrel; said inner body with the inner casing suspended therefrom and said packing structure being movable downwardly as a unit with said mandrel and running string to a position of support of said inner body on said outer body and with said packing structure in open relation to said passage; and hydraulically operable means releasably connected to said packing structure and in slidable engagement with said mandrel for shifting said packing structure to a position closing said passage after support of said inner body on said outer body.

2. In well bore casing apparatus as defined in claim 1; said hydraulically operable means comprising means shiftable longitudinally of said mandrel in response to fluid pressure in said mandrel.

3. In well bore casing apparatus as defined in claim 1; said hydraulically operable means comprising cylinder means slidable downwardly along and in engagement with said mandrel in response to fluid pressure in said mandrel.

4. In well bore casing apparatus as defined in claim 1; said hydraulically operable means comprising cylinder means slidable downwardly along and in engagement with said mandrel in response to fluid pressure in said mandrel; and means for locking said packing structure to one of said bodies to retain said packing structure in its passage closing position.

5. In well bore casing apparatus as defined in claim 1; said mandrel having a fluid passage; said hydraulically operable means comprising cylinder means slidable along and in engagement with said mandrel, and plug means movable in said mandrel passage to a position directing fluid under pressure in said mandrel passage to said cylinder means to shift said cylinder means downwardly along said mandrel.

6. In well bore casing apparatus as defined in claim 1; said inner body having ratchet teeth thereon; said hydraulically operable means including a ratchet member having ratchet teeth meshable with said other ratchet teeth and movable downwardly of said inner body during movement of said packing structure to a passage closing position, said teeth on said inner body and ratchet member meshing top revent upward movement of said ratchet member along said inner body.

7. In well bore casing apparatus as defined in claim 1; said inner body having ratchet teeth thereon; said hydraulically operable means including a ratchet member having ratchet teeth meshable with said other ratchet teeth, and cylinder means slidable downwardly along and in engagement with said mandrel in response to fluid pressure in said mandrel for moving said ratchet member downwardly of said inner body and said packing structure downwardly to passage closing position, said teeth on said inner member and ratchet member meshing to prevent upward movement of said ratchet member along said inner body.

8. In well bore casing apparatus as defined in claim 1; said inner body having a ratchet buttress thread thereon; said hydraulically operable means including a ratchet member having a ratchet buttress thread meshable with said other thread and movable downwardly of said inner body during movement of said packing structure to passage closing position, said buttress threads on said inner body and ratchet member meshing to prevent upward movement of said ratchet member along said inner body.

9. In well bore casing apparatus as defined in claim 1; said inner body having a ratchet buttress thread thereon; said hydraulically operable means including a ratchet member having a ratchet buttress thread thereon meshable with said other thread, and cylinder means slidable downwardly along and in engagement with said mandrel in response to fluid pressure in said mandrel for moving said ratchet member downwardly of said inner body and said packing structure downwardly to passage closing position, said buttress threads on said inner member and ratchet member meshing to prevent upward movement of said ratchet member along said inner body.

10. In well bore casing apparatus as defined in claim 1; said inner body having ratchet teeth thereon; said hydraulically operable means including a ratchet member having ratchet teeth meshable with said other ratchet teeth and movable downwardly of said inner body during movement of said packing structure to a passage closing position, said teeth on said inner body and ratchet member meshing to prevent upward movement of said ratchet member along said inner body; said hydraulically operable means further including spring means for exerting a continuing force on said packing structure retaining said packing structure in its passage closing position.

11. In well bore casing apparatus as defined in claim 1; said inner body having a ratchet buttress thread thereon; said hydraulically operable means including a ratchet member having a ratchet buttress thread thereon meshable with said other thread, and cylinder means slidable downwardly along and in engagement with said mandrel in response to fluid pressure in said mandrel for moving said ratchet member downwardly of said inner body and said packing structure downwardly to passage closing position, said buttress threads on said inner member and ratchet member meshing to prevent upward movement of said ratchet member along said inner body; said hydraulically operable means further including spring means for exerting a continuing force on said packing structure retaining said packing structure in its passage closing position.

12. In well bore casing apparatus: an outer body connectible to an outer casing; an inner body supportable by said outer body for suspending an inner casing within the outer casing; said inner and outer bodies providing a fluid passage therebetween communicating with the annular space between the inner and outer casings; said inner and outer bodies having opposed sealing surfaces spaced from each other to provide an annular passage therebetween constituting a portion of said fluid passage; one of said bodies having an upwardly facing shoulder; a packing structure disposed initially above and longitudinally spaced from said shoulder and adapted to be moved in said annular passage; a mandrel releasably connected to said inner body and adapted for connection to a running string; means releasably connecting said packing structure to said mandrel; said inner body with the inner casing suspended therefrom and said packing structure being movable downwardly as a unit with said mandrel and running string to a position of support of said inner body on said outer body and with said packing structure in open relation to said annular passage; and hydraulically operable means releasably connected to said packing structure and in slidable engagement with said mandrel for moving said packing structure downwardly into said annular passage and against said shoulder to compress said packing structure against said sealing surfaces to close said annular passage.

13. In well bore casing apparatus as defined in claim 12; said hydraulically operable means comprising cylinder means slidable downwardly along and in engagement with said mandrel in response to fluid pressure in said mandrel.

14. In well bore casing apparatus as defined in claim 12; said mandrel having a fluid passage; said hydraulically operable means comprising cylinder means slidable along and in engagement with said mandrel, and plug means movable in said mandrel passage to a position directing fluid under pressure in said mandrel passage to said cylinder means to shift said cylinder means downwardly along said mandrel.

15. In well bore casing apparatus as defined in claim 12; said inner body having ratchet teeth thereon; said hydraulically operable means including a ratchet member having ratchet teeth meshable with said other ratchet teeth and movable downwardly of said inner body during movement of said packing structure into said annular passage and into compressed relation against said sealing surfaces, said teeth on said inner body and ratchet member meshing to prevent upward movement of said ratchet member along said inner body.

16. In well bore casing apparatus as defined in claim 12; said inner body having a ratchet buttress thread thereon; said hydraulically operable means including a ratchet member having a ratchet buttress thread meshable with said other thread, and cylinder means slidable downwardly along and in engagement with said mandrel in response to fluid pressure in said mandrel for moving said ratchet member downwardly of said inner body and said packing structure into said annular passage to compress said packing structure against said sealing surfaces, said buttress threads on said inner member and ratchet member meshing to prevent upward movement of said ratchet member along said inner body.

17. In well bore casing apparatus as defined in claim 12; said inner body having a ratchet buttress thread thereon; said hydraulically operable means including a ratchet member having a ratchet buttress thread meshable with said other thread, and cylinder means slidable downwardly along and in engagement with said mandrel in response to fluid pressure in said mandrel for moving said ratchet member downwardly of said inner body and packing structure into said annular passage to compress said packing structure against said sealing surfaces, said buttress threads on said inner member and ratchet member meshing to prevent upward movement of said ratchet member along said inner body; said hydraulically operable means including spring means for exerting a continuing force on said packing structure retaining said packing structure compressed against said sealing surfaces.

18. In well bore casing apparatus: an outer body connectible to an outer casing; an inner body supportable by said outer body for suspending an inner casing within the outer casing; said inner and outer bodies providing a fluid passage therebetween communicating with the annular space between the inner and outer casings; a packing structure for closing said passage; a mandrel adapted for connection to a running string; means releasably connecting said mandrel to said inner body; means releasably connecting said packing structure to said mandrel; said inner body with the inner casing suspended therefrom and said packing structure being movable downwardly as a unit with said mandrel and running string to a position of support of said inner body on said outer body and with said packing structure in open relation to said passage; and means slidable downwardly along said mandrel in engagement therewith for shifting said packing structure to a position closing said passage after support of said inner body on said outer body, said shifting means being slidable downwardly along said mandrel in engagement therewith during shifting of said packing structure to passage closing position, said shifting means including spring means for exerting a continuing force on said packing structure retaining said packing structure in its passage closing position.

19. In well bore casing apparatus: an outer body connectible to an outer casing; an inner body supportable by said outer body for suspending an inner casing within the outer casing; said inner and outer bodies providing a fluid passage therebetween communicating with the annular space between the inner and outer casings; said inner and outer bodies having opposed sealing surfaces spaced from each other to provide an annular passage therebetween constituting a portion of said fluid passage; one of said bodies having an upwardly facing shoulder; a packing structure disposed initially above and longitudinally spaced from said shoulder and annular passage and adapted to be moved into said annular passage; a mandrel releasably connected to said inner body and adapted for connection to a running string; means releasably connecting said packing structure to said mandrel; said inner body with the inner casing suspended therefrom and said packing structure being movable downwardly as a unit with said mandrel and running string to a position of support of said inner body on said outer body and with said packing structure in open relation to said annular passage; and means slidable downwardly along said mandrel in engagement therewith for moving said packing structure downwardly into said annular passage and against said shoulder to compress said packing structure against said sealing surfaces to close said annular passage, said moving means including spring means for exerting a continuing force on said packing structure retaining said packing structure compressed against said sealing surfaces.

References Cited

UNITED STATES PATENTS

| | | | |
|---|---|---|---|
| 2,163,422 | 6/1939 | Church | 166—86 X |
| 3,098,525 | 7/1963 | Haeber | 166—0.6 |
| 3,115,933 | 12/1963 | Haeber | 166—0.6 |
| 3,273,646 | 9/1966 | Walker | 285—140 X |
| 3,279,539 | 10/1966 | Brown et al. | 285—142 X |
| 3,322,193 | 5/1967 | Word | 166—0.6 |

CARL W. TOMLIN, Primary Examiner

DAVE W. AROLA, Assistant Examiner

U.S. Cl. X.R.

166—0.6, 87; 285—101, 142, 321, 348